(12) United States Patent
Park et al.

(10) Patent No.: US 8,358,717 B2
(45) Date of Patent: Jan. 22, 2013

(54) DEVICE AND METHOD FOR BINARY PHASE SHIFT KEY DEMODULATOR USING PHASE SHIFTER

(75) Inventors: Seung Keun Park, Daejeon (KR); Jin A Park, Daejeon (KR); Heon Jin Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 630 days.

(21) Appl. No.: 12/548,826

(22) Filed: Aug. 27, 2009

(65) Prior Publication Data

US 2010/0150273 A1 Jun. 17, 2010

(30) Foreign Application Priority Data

Dec. 16, 2008 (KR) .................. 10-2008-0127931

(51) Int. Cl.
*H04L 27/10* (2006.01)
(52) U.S. Cl. ........ 375/284; 375/261; 375/279; 455/130; 455/131
(58) Field of Classification Search .......... 375/259–261, 375/271, 279, 316, 322, 324–326, 329, 284; 455/130, 131
See application file for complete search history.

(56) References Cited

U.S. PATENT DOCUMENTS

| | | | | |
|---|---|---|---|---|
| 5,325,401 A * | 6/1994 | Halik et al. | | 375/329 |
| 5,852,630 A * | 12/1998 | Langberg et al. | | 375/219 |
| 2001/0028276 A1* | 10/2001 | Kim et al. | | 331/10 |
| 2006/0193401 A1 | 8/2006 | Lopez Villegas et al. | | |
| 2007/0019900 A1* | 1/2007 | Taylor et al. | | 385/14 |
| 2007/0058754 A1* | 3/2007 | Lin et al. | | 375/332 |
| 2007/0186251 A1* | 8/2007 | Horowitz et al. | | 725/63 |
| 2009/0190683 A1* | 7/2009 | Awater et al. | | 375/262 |
| 2009/0207889 A1* | 8/2009 | Kobayashi et al. | | 375/142 |
| 2009/0219064 A1* | 9/2009 | Ikeda | | 327/136 |

FOREIGN PATENT DOCUMENTS

| | | |
|---|---|---|
| KR | 1019970007873 B1 | 5/1997 |
| KR | 100171032 B1 | 10/1998 |
| KR | 1020000047026 A | 7/2000 |

\* cited by examiner

*Primary Examiner* — David C. Payne
*Assistant Examiner* — James M Perez
(74) *Attorney, Agent, or Firm* — Ladas & Parry LLP

(57) ABSTRACT

Disclosed is a binary phase shift key (BPSK) demodulating device using a phase shifter and a method thereof. The BPSK demodulating device includes an I signal generator to generate an in-phase (I) signal from a received BPSK signal, a Q signal generator to generate a quadrature-phase (Q) signal from the received BPSK signal, using a plurality of phase shifters, an oscillator to generate a first signal to separate a baseband signal, and a determining unit to determine a transmission phase angle based on the I signal and the Q signal.

9 Claims, 8 Drawing Sheets

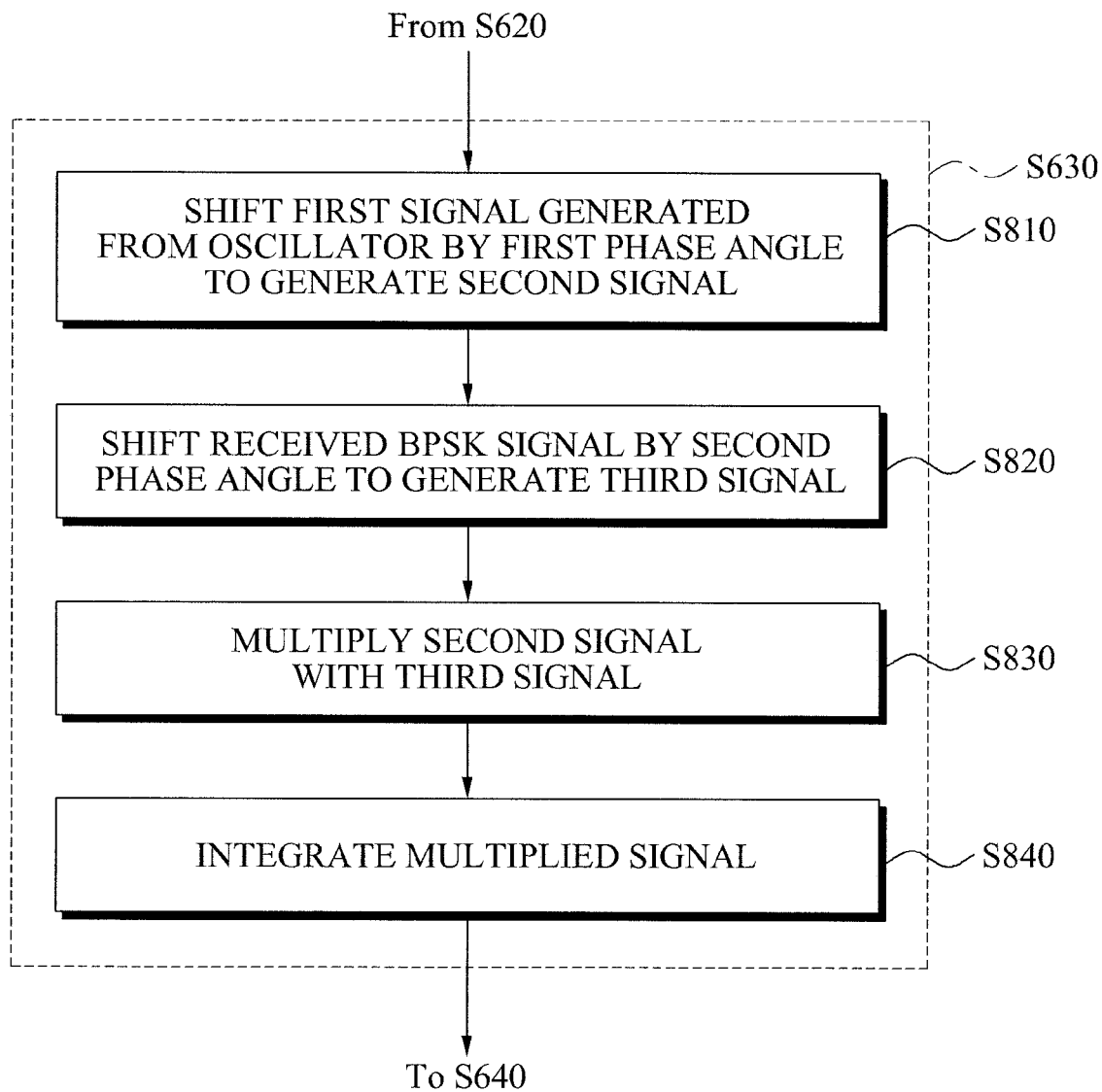

DEVICE AND METHOD FOR BINARY PHASE SHIFT KEY DEMODULATOR USING PHASE SHIFTER

CROSS-REFERENCE TO RELATED APPLICATION

This application claims the benefit of Korean Patent Application No. 10-2008-0127931, filed on Dec. 16, 2008, in the Korean Intellectual Property Office, the disclosure of which is incorporated herein by reference.

BACKGROUND

1. Field of the Invention

The present invention relates to a binary phase shift key (BPSK) demodulating device using a phase shifter and a method thereof, and more particularly, to a BPSK demodulating device and method that demodulates a received BPSK modulation signal using a plurality of phase shifters to embody demodulation with a low bit error rate.

2. Description of the Related Art

A wireless communication system uses a variety of modulation/demodulation schemes, such as binary phase shift keying (BPSK), quadrature phase shift keying (QPSK), quadrature amplitude modulation (QAM), and the like, depending on a received signal-noise-to ratio (SNR), and, generally, for the important information such as sync, the BPSK is used. Therefore, a BPSK demodulation/modulation technique capable of being utilized in an environment where electromagnetic wave noise exists, is important.

A conventional BPSK demodulating device separates an I signal and a Q signal using a single phase shifter having a phase difference of 90 degrees and performs demodulation to separate a baseband of the I signal and Q signal from a received signal. However, a new demodulation method, having high efficiency in a bit error rate in comparison with the conventional BPSK under a same SNR environment, is required.

Accordingly, there is a need for a technology that separates the I signal and Q signal using a plurality of phase shifters, and determines a transmission phase angle based on a new determination area, thereby providing a BPSK demodulating device with a low bit error rate, and method thereof.

SUMMARY

According to an aspect of the present invention, there is provided a binary phase shift key (BPSK) demodulating device using a phase shifter, the device including an I signal generator to generate an in-phase (I) signal from a received BPSK signal, a Q signal generator to generate a quadrature-phase (Q) signal from the received BPSK signal, using a plurality of phase shifters, an oscillator to generate a first signal to separate a baseband signal, and a determining unit to determine a transmission phase angle based on the I signal and the Q signal.

In this instance, the BPSK demodulating device may further include a reception antenna to receive a BPSK signal, and a low noise amplifier to amplify the received BPSK signal.

Also, the I signal generator may include a first mixer to multiply the first signal generated from the oscillator with the received BPSK signal, and an integrator to integrate a signal generated from the first mixer.

Also, the Q signal generator may include a first phase shifter to generate a second signal by shifting the first signal generated from the oscillator by a first shift angle, a second phase shifter to generate a third signal by shifting the received BPSK signal by the second phase angle, a second mixer to multiply the second signal with the third signal, and a second integrator to integrate a signal generated from the second mixer.

According to an aspect of the present invention, there is provided a BPSK demodulating method, the method including generating a first signal to separate a baseband signal, generating an I signal from a received BPSK signal, generating a Q signal from the received BPSK signal using a plurality of phase shifters, and determining a transmission phase angle based on the I signal and the Q signal.

In this instance, the generating of the I signal may include multiplying the first signal generated from an oscillator with the received BPSK signal, and integrating the multiplied signal.

Also, the generating of the Q signal may include generating a second signal by shifting the first signal generated from an oscillator by a first phase angle, generating a third signal by shifting the received BPSK signal by a second phase angle, multiplying the second signal with the third signal, and integrating the multiplied signal.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 8 is a flowchart illustrating a method of generating a Q signal according to the BPSK demodulating method of FIG. 6.

DETAILED DESCRIPTION

Figure 1:
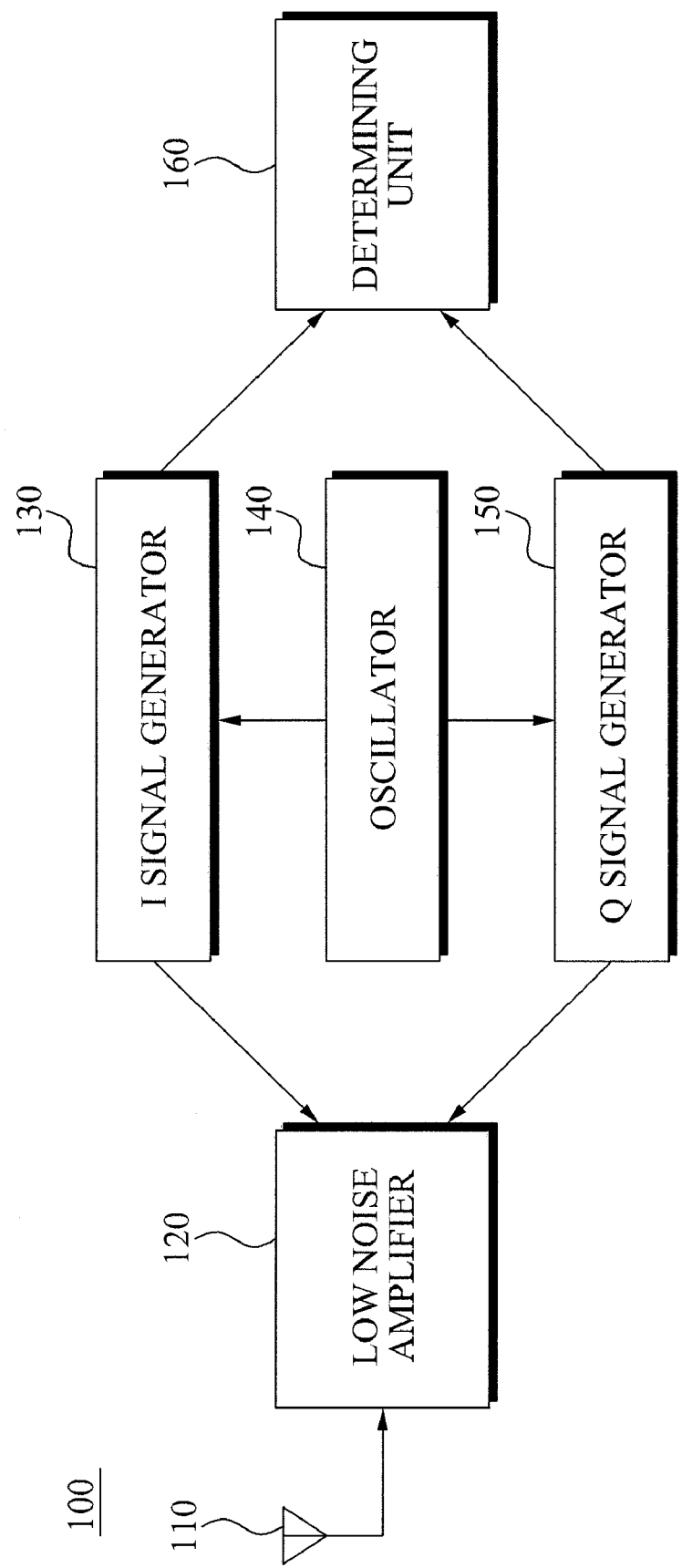
FIG. 1 is a block diagram illustrating a binary phase shift keying (BPSK) demodulating device using a phase shifter according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram illustrating a binary phase shift keying (BPSK) demodulating device 100 using a phase shifter according to an embodiment of the present invention.

With reference to FIG. 1, the BPSK demodulating device 100 may include an I signal generator 130, a Q signal generator 150, an oscillator 140, and a determining unit 160. Also, the BPSK demodulating device 100 using the phase shifter may further include a receiving antenna 110 and low noise amplifier 120.

The reception antenna 110 may receive a modulated BPSK signal and the low noise amplifier 120 may amplify the received BPSK signal. The amplified signal may be respectively inputted to an I channel and a Q channel.

Here, as an example, a BPSK signal received in a Gaussian channel environment may be expressed as Equation 1 below.

$$r(t) = \sqrt{2E_b/T_b} \cos(\omega_o t + \theta_m) + n(t) \quad \text{[Equation 1]}$$

Here, Eb is bit energy, Tb is a bit transmission time, $\omega_o$ is a carrier wave, $\theta_m$ is a phase angle of 0 or $\pi$ respectively corresponding to '0' and '1', n(t) is Gaussian noise that has 0 as an average and $\sigma^2$ as dispersion. Also, when the received signal r(t) is expressed as a vector signal, it is expressed as given in Equation 2.

$$r(t) = \sqrt{E_b} \cos\theta_m \Phi_I(t) + \sqrt{E_b} \sin\theta_m \Phi_Q(t) + n(t) \quad \text{[Equation 2]}$$

Here, $\Phi_I(t) = \sqrt{2/T_b} \cos(\omega_o t)$ and $\Phi_Q(t) = -\sqrt{2/T_b} \sin(\omega_o t)$ The oscillator 140 generates a first signal to separate a base band signal. That is, an I signal and a Q signal may be generated using the first signal generated from the oscillator.

The I signal generator 130 may generate the I signal of the baseband using the received BPSK signal and the first signal generated from the oscillator 140.

The Q signal generator 150 may generate the Q signal of the baseband from the received BPSK signal, using the first signal generated from the oscillator and a plurality of phase shifters. Here, the I signal generator 130 and the Q signal generator 150 will be described in detail with reference to FIG. 2.

Figure 2:
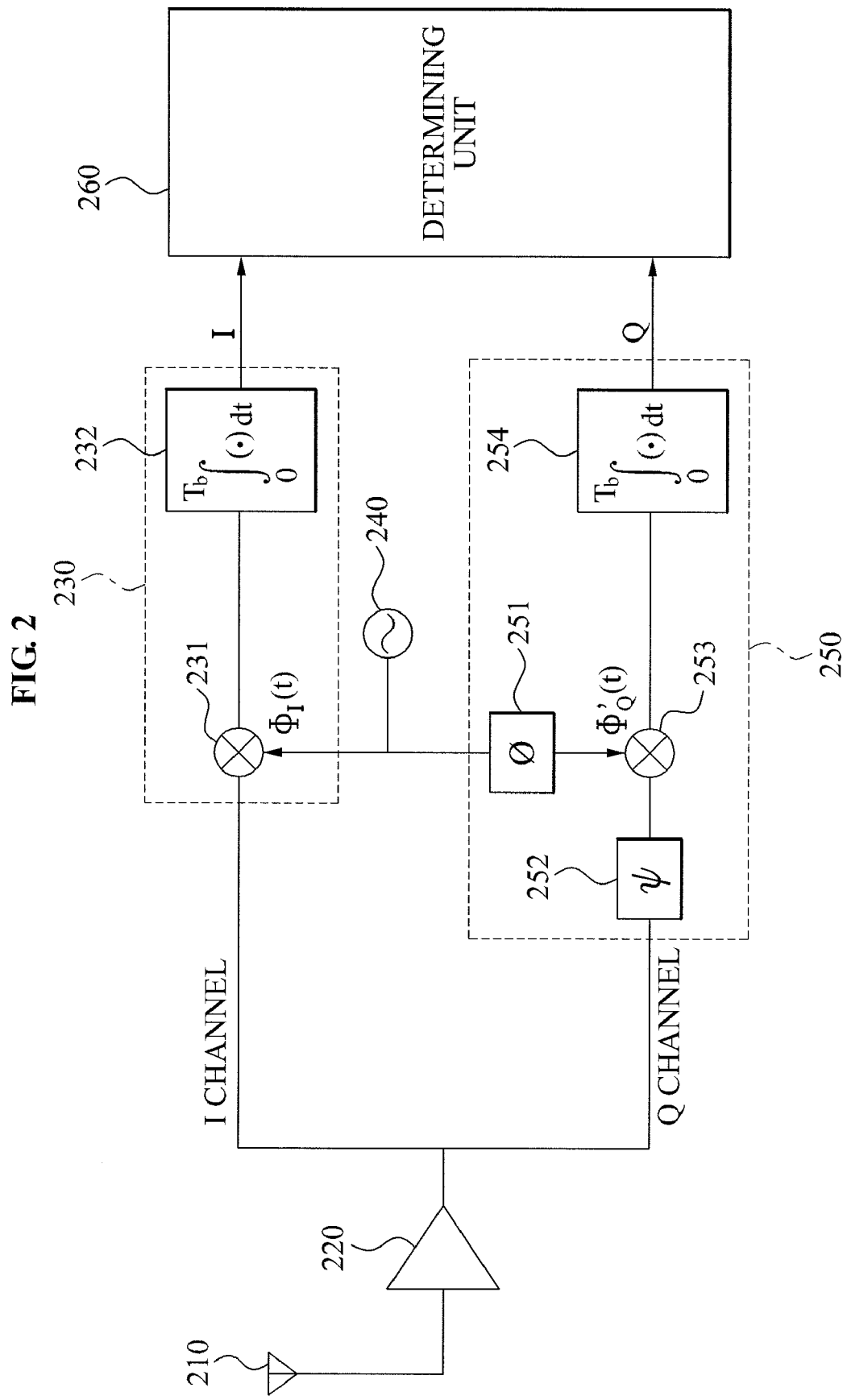
FIG. 2 is a diagram illustrating a BPSK demodulating device using a phase shifter according to another embodiment of the present invention.

FIG. 2 is a diagram illustrating a BPSK demodulating device using a phase shifter according to another embodiment of the present invention.

As illustrated in FIG. 2, an I signal generator 230 may include a first mixer 231 and a first integrator 232.

To generate an I signal, a BPSK signal received through a reception antenna 210 is amplified through a low noise amplifier 220 and the amplified signal is multiplied with a $\Phi_I(t)$ signal generated from an oscillator 240. Subsequently, the multiplied signal is integrated by the first integrator 232, and thus, the I signal is generated.

That is, a signal inputted to an I channel, $\sqrt{E_b} \cos\theta_m \Phi_I(t) + \sqrt{E_b} \sin\theta_m \Phi_Q(t) + n(t)$, is multiplied with a signal generated from the oscillator 240, $\Phi_I(t) = \sqrt{2/T_b} \cos(\omega_o t)$, and the multiplied signal is integrated by the first integrator, and thus, the I signal is outputted.

Also, the Q signal generator 250 may include a second mixer 253, a first phase shifter 251, a second phase shifter 252, and a second integrator 232.

To generate a Q signal, the first phase shifter 251 shifts a first signal generated from the oscillator by a first phase angle Ø to generate a second signal, $F'_Q(t) = -\sqrt{2/T_b} \sin(w_c t - f) = \sin f F_I(t) + \cos f F_Q(t) \Phi'_Q(t) = -\sqrt{2/T_b} \sin(w_o t - \phi)$. Also, the second phase shifter 252 shifts a signal, the signal being amplified by the low noise amplifier 220 after being received through the reception antenna 210, by a second phase angle to generate a third signal, $\sqrt{E_b} \cos(\theta_m + \psi)\Phi_I(t) + \sqrt{E_b} \sin(\theta_m + \psi)\Phi_Q(t) + n(t)$. In this instance, the second mixer 253 may perform multiplexing of the second signal with the third signal, and may output the Q signal through the second integrator 232.

In this instance, the I signal and the Q signal inputted to the determining unit 260 are respectively expressed as given in Equation 3 below.

$$I = \sqrt{E_b} \cos\theta_m + n_I$$

$$Q = \sqrt{E_b} \sin(\theta_m + \psi + \phi) + n_Q \quad \text{[Equation 3]}$$

Here, two random variables $n_I$ and $n_Q$ are Gaussian that has 0 as an average and $\sigma^2$ as dispersion, and a correlation coefficient is $\rho = \sin\phi$. Also, $\psi$ and Ø may use a phase angle as given in Table 1.

TABLE 1

| $\theta_m$ | $\psi$ | Ø |
|---|---|---|
| 0 | $-3\pi/4$ | $\pi/4$ |
| $\pi$ | $-3\pi/4$ | $\pi/4$ |

Referring again to FIG. 1, the determining unit 160 may determine a transmission phase angle based on the I signal and the Q signal to perform demodulation of a received BPSK signal. In this instance, a new determination area may be used for determining the transmission phase angle, and the operation will be described in detail with reference FIGS. 3 and 4.

Figure 3:
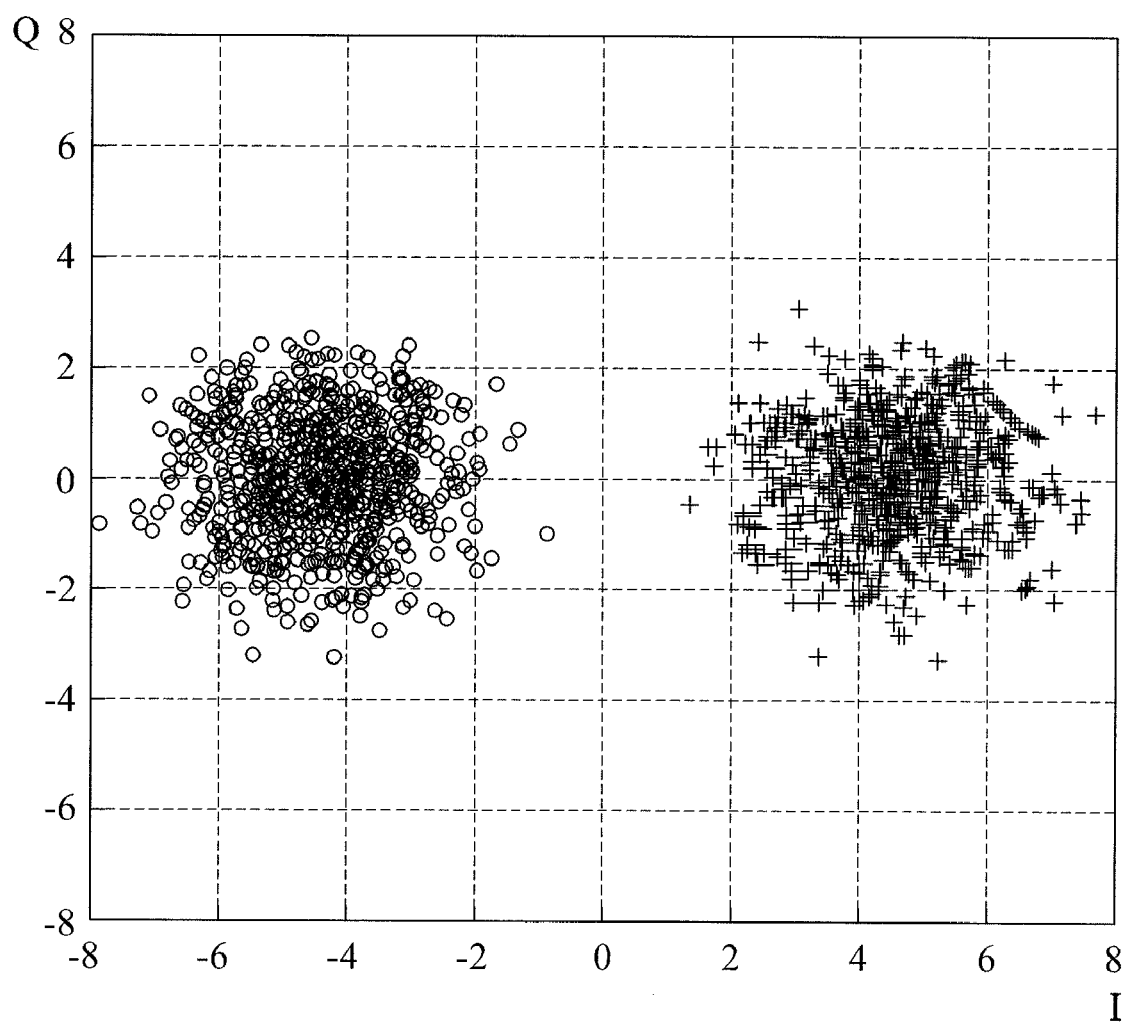
FIG. 3 is a constellation diagram in a conventional BPSK system.

FIG. 3 is a constellation diagram in a conventional BPSK system having a transmission phase angle $\theta_m \in \{0, \pi\}$ and an SNR of 10 dB. As illustrated in FIG. 3, the constellation diagram of FIG. 3 is drawn based on a signal I and a signal Q. Here, a bit error rate of the conventional BPSK system in a Gaussian channel environment may be obtained based on Equation 4 as below.

$$P_1(E) = Q\left(\sqrt{\frac{2E_b}{N_0}}\right) \quad \text{[Equation 4]}$$

Here, the bit error rate of the BPSK is calculated based on $P_1(E) = 0.5P(E|\theta_m = 0) + 0.5P(E|\theta_m = \pi)$, and the equation may be $P(E|\theta_m = 0) = P(E|\theta_m = \pi)$ based on the constellation diagram of FIG. 3.

Figure 4:
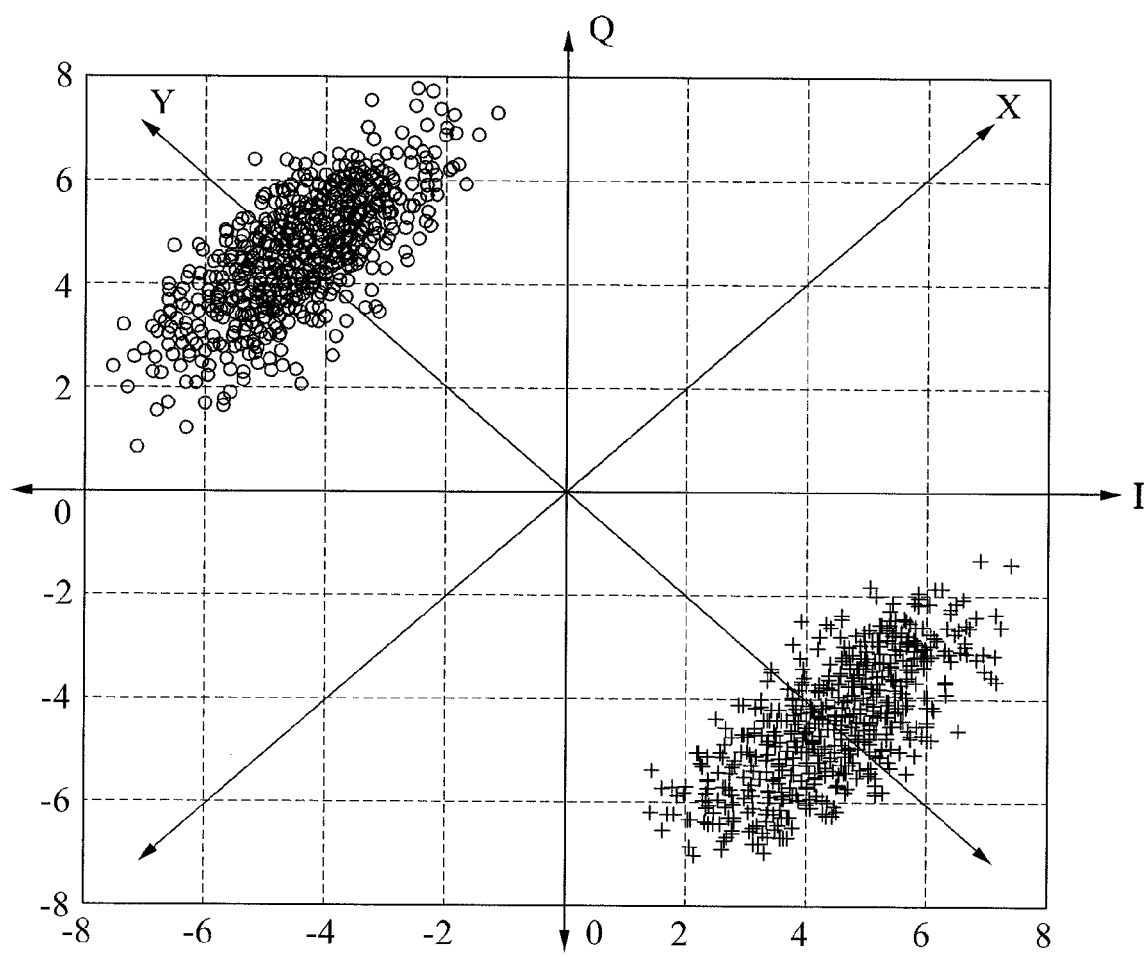
FIG. 4 is a diagram illustrating a determination area of a BPSK demodulating device using a rotational transformation according to an embodiment of the present invention.

FIG. 4 is a diagram illustrating a determination area of a BPSK demodulating device using a rotational transformation according to an embodiment of the present invention As illustrated in FIG. 4, a rotational transformation as given in Equation 5 below may be used as a new determination area of an embodiment of the present invention.

$$\begin{bmatrix} X \\ Y \end{bmatrix} = \begin{bmatrix} \cos(\pi/4) & \sin(\pi/4) \\ -\sin(\pi/4) & \cos(\pi/4) \end{bmatrix} \begin{bmatrix} I \\ Q \end{bmatrix} \quad \text{[Equation 5]}$$

Also, since an area of a bit error rate that occurs when a transmission phase angle $\theta_m = \pi$ is $\{Y < 0\}$, the bit error rate $P(E|q_m = p)$, is obtained as given in Equation 6 below.

$$P(E|\theta_m = \pi) = Pr\{Y < 0\}$$

$$= Pr\left\{\frac{Y - \mu_Y}{\sigma_Y} < -\frac{\mu_Y}{\sigma_Y}\right\} = Q\left(\frac{\mu_Y}{\sigma_Y}\right) \quad \text{[Equation 6]}$$

Here, $$m_Y = -\sqrt{\frac{E_b}{2}}\cos(p) + \sqrt{\frac{E_b}{2}}\sin\frac{p}{2} = \sqrt{2E_b},$$

$$s_Y = s\sqrt{\frac{\sqrt{2}-1}{\sqrt{2}}} = s\sqrt{c}, \text{ and}$$

C may be an constant of 0.2929.

That is, the new BPSK determination area with respect to the transmission phase angle $\theta_m = \pi$ may be $-I/\sqrt{2}+Q/\sqrt{2}<0$ using Y<0 of Equation 6. Also, since a discriminant with respect to the transmission phase angle $\theta_m = 0$ is Y>0, the determination area may be $-I/\sqrt{2}+Q/\sqrt{2}>0$. Accordingly, a determining unit may determine the transmission phase angle 0 or $\pi$ based on $-I/\sqrt{2}+Q/\sqrt{2}<0$ or $-I/\sqrt{2}+Q/\sqrt{2}>0$.

Also, when transmission phase angle $\theta_m = \pi$ and Gaussian noise dispersion $\sigma^2 = N_0/2$ is substituted for Equation 6, a final bit error rate of an embodiment of the present invention $P_2(E)$ may be expressed as given in Equation 7.

$$P_2(E) = P(E|\theta_m = \pi) \quad \text{[Equation 7]}$$
$$= Q\left(\sqrt{\frac{4}{c}\frac{E_b}{B_0}}\right)$$
$$= Q\left(\sqrt{\frac{13.6565E_b}{N_0}}\right)$$

Here, $E_b/N_0$ is an SNR.

In this instance, a comparison result comparing a conventional bit error rate and a bit error rate according to an embodiment of the present invention will be described with reference to FIG. 5.

Figure 5:
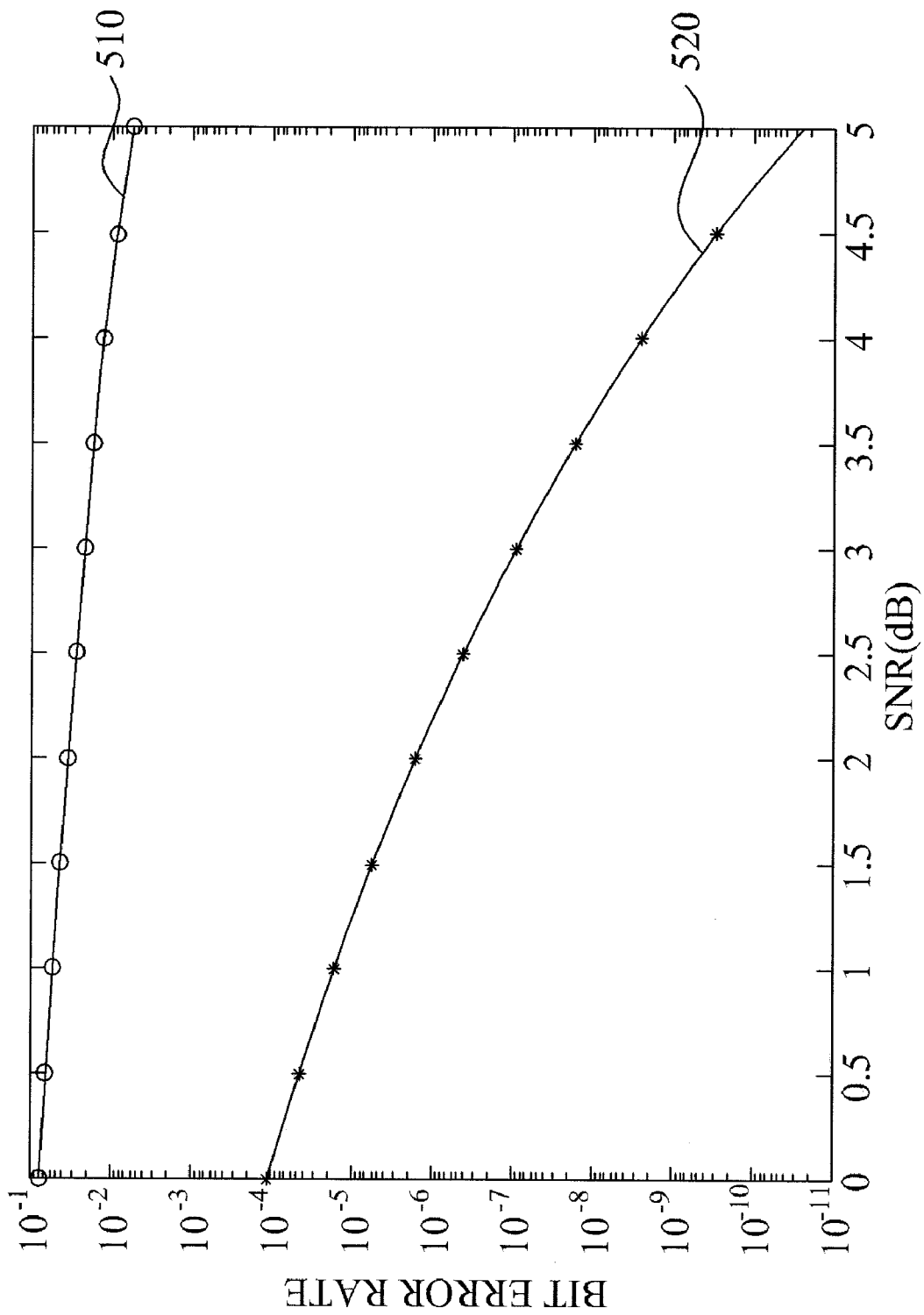
FIG. 5 is a graph comparing a bit error rate of a conventional BPSK with a bit error rate of a BPSK according to an embodiment of the present invention.

FIG. 5 illustrates a curve 510 of a bit error rate of a conventional BPSK system with respect to an SNR and a curve 520 of a bit error rate according to an embodiment of the present invention with respect to the SNR, and also shows that the bit error rate according to the embodiment of the present invention is significantly lower compared with the error rate of the conventional BPSK.

As described above, a BPSK signal is demodulated by shifting a Q signal by $\psi$ and shifting a first signal of an oscillator by $\varnothing$, thereby providing a BPSK demodulating device with a low bit error rate and method thereof.

Figure 6:
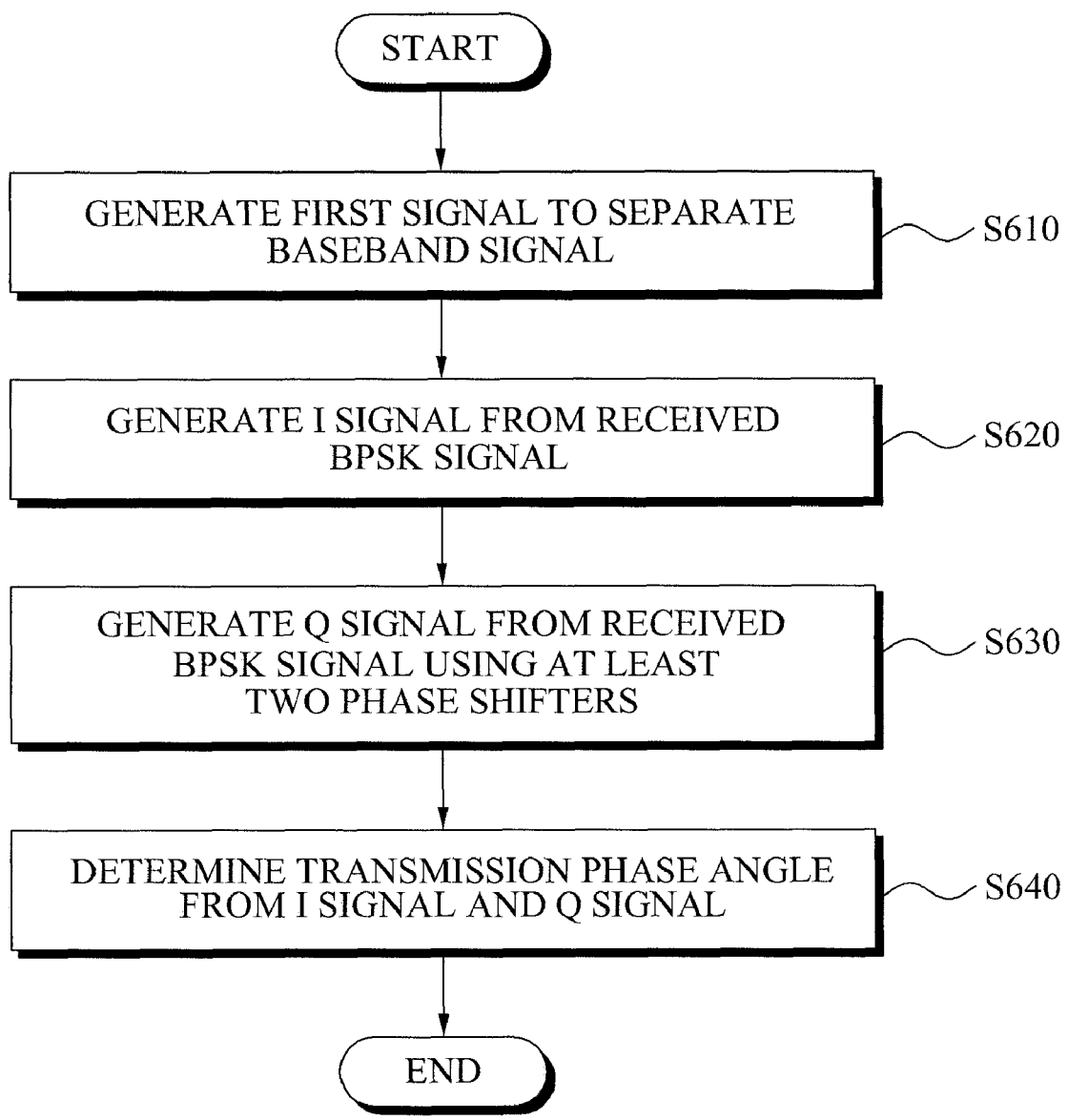
FIG. 6 is a flowchart illustrating a BPSK demodulating method using a phase shift according to an embodiment of the present invention.

FIG. 6 is a flowchart illustrating a BPSK demodulating method using a phase shift according to an embodiment of the present invention.

With reference to FIG. 6, a first signal for separating a baseband signal is generated from an oscillator in operation S610.

In operation S620, an I signal is generated from a received BPSK signal. Here, a procedure of generating the I signal will be described in detail with reference to FIG. 7.

Figure 7:
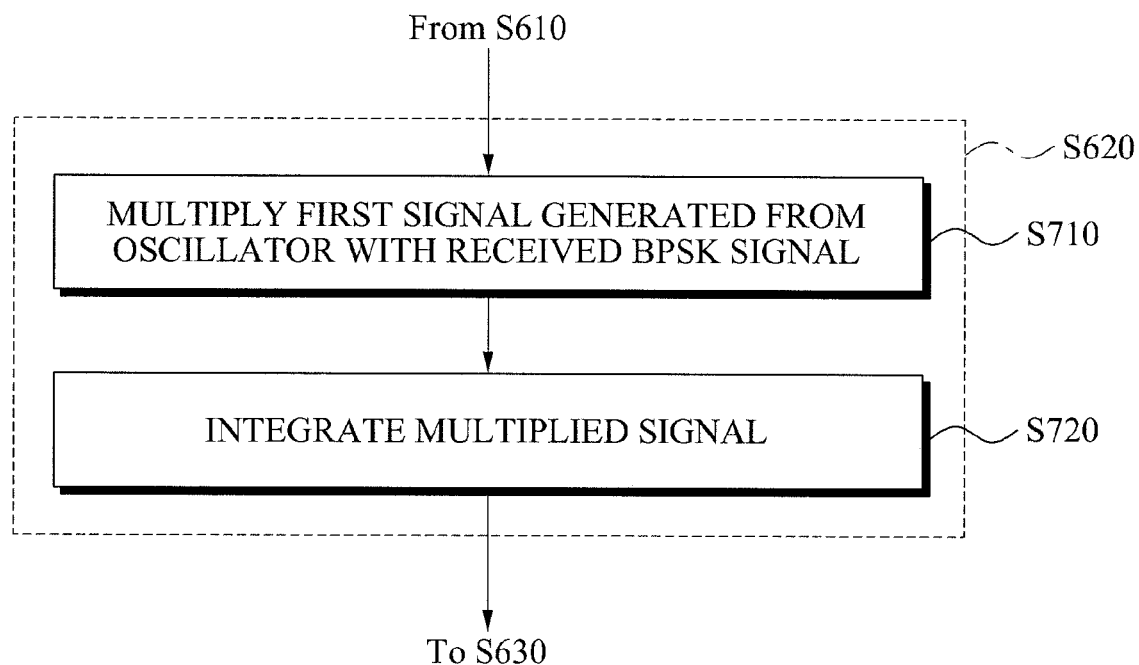
FIG. 7 is a flowchart illustrating a method of generating an I signal according to the BPSK demodulating method of FIG. 6.

FIG. 7 is a flowchart illustrating a method of generating the I signal according to the BPSK demodulating method of FIG. 6.

With reference to FIG. 7, the first signal generated from the oscillator is multiplied with the received BPSK in operation S710. In this instance, the signal generated from the oscillator may be $\Phi_I(t) = \sqrt{2/T_b}\cos(\omega_o t)$.

In operation S720, the I signal is generated by integrating the multiplied signal.

With reference again to FIG. 6, a Q signal is generated from the received BPSK signal using a plurality of phase shifters in operation S630. Here, a procedure of generating the Q signal will be described in detail with reference to FIG. 8.

FIG. 8 is a flowchart illustrating a method of generating the Q signal according to the BPSK demodulating method of FIG. 6.

With reference to FIG. 8, a second signal is generated by shifting the first signal generated from the oscillator by a first phase angle ($\varnothing$) in operation S810. Here, the shifted second signal may be $F'_Q(t) = -\sqrt{2/T_b}\sin(w_c t - f) = \sin fF_I(t) + \cos fF_Q(t)$.

In operation S820, a third signal is generated by shifting the received BPSK signal by a second phase angle ($\psi$). Here, the third signal may be $\sqrt{E_b}\cos(\theta_m + \psi)\Phi_I(t) + \sqrt{E_b}\sin(\theta_m + \psi)\Phi_Q(t) + n(t)$.

In operation S830, the second signal is multiplied with the third signal. In operation S840, the Q signal is outputted by integrating the multiplied signal.

With reference again to FIG. 6, a transmission phase angle may be determined based on the I signal and the Q signal. In this instance, the transmission phase angle is determined according to a new determination area generated using a rotational transformation.

As described the above, the Q signal is generated by shifting a received signal by $\psi$ using a plurality of phase shifters and shifting a signal generated from the oscillator by $\varnothing$, and the I signal is generated using the received signal and the signal generated from the oscillator. Also, the transmission phase angle is determined based on the determination area using the rotational transformation, and thus a BPSK demodulating device with a low bit error rate and a method thereof may be provided.

Also, the BPSK demodulating device and method may be applied to a wireless communication system, and the like, and also, may be effective in a BPSK satellite communication system that transmits a weak signal in cyber space.

Also, the BPSK demodulating method using a phase shifter according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A binary phase shift key (BPSK) demodulating device, the device comprising:
   the BPSK demodulating device is configured to receive a BPSK signal;
   an I signal generator to generate an in-phase (I) signal from the received BPSK signal;
   a Q signal generator to generate a quadrature-phase (Q) signal from the received BPSK signal, and
   wherein the Q signal generator uses at least one of a plurality of phase shifters and modules having a function of phase shift;
   an oscillator to generate a first signal to separate a baseband signal from the received BPSK signal, and
   wherein the I signal and the Q signal are configure to be generated using the first signal from the oscillator,
   wherein the Q signal is further configure to be generated using at least the first signal from the oscillator and the at least one of the plurality of phase shifter and the modules having the function of phase shift, and
   wherein the Q signal generator further comprises:
      a first phase shifter to generate a second signal by shifting the first signal generated from the oscillator by a first shift angle;
      a second phase shifter to generate a third signal by shifting the received BPSK signal by the second phase angle;
      a second mixer to multiply the second signal with the third signal; and
      a second integrator to integrate a signal generated from the second mixer; and
   a determining unit to determine a transmission phase angle based on the I signal and the Q signal, wherein the determining unit generates a determination area using a rotational transformation of Equation 5 as $$\begin{bmatrix} X \\ Y \end{bmatrix} = \begin{bmatrix} \cos(\pi/4) & \sin(\pi/4) \\ -\sin(\pi/4) & \cos(\pi/4) \end{bmatrix} \begin{bmatrix} I \\ Q \end{bmatrix}. \quad \text{[Equation 5]}$$

2. The device of claim 1, further comprising:
   a reception antenna to receive the BPSK signal; and
   a low noise amplifier to amplify the received BPSK signal.

3. The device of claim 1, wherein the I signal generator comprises:
   a first mixer to multiply the first signal generated from the oscillator with the received BPSK signal; and
   an integrator to integrate a signal generated from the first mixer.

4. The device of claim 1, wherein the determining unit determines the transmission phase angle using the I signal generated from a first integrator and the Q signal generated from the second integrator.

5. A BPSK demodulating method, the method comprising:
   receiving a BPSK signal;
   generating a first signal to separate a baseband signal from the received BPSK signal;
   generating an I signal from the received BPSK signal;
   generating a Q signal from the received BPSK signal, and
   wherein the generating Q signal uses at least one of a plurality of phase shifters and modules having a function of phase shift, and
   wherein the I signal and the Q signal are generated using the first signal from the oscillator,
   wherein the generating of the Q signal comprises:
      generating a second signal by shifting the first signal generated from the oscillator by a first phase angle;
      generating a third signal by shifting the received BPSK signal by a second phase angle;
      multiplying the second signal with the third signal; and
      integrating the multiplied signal, and
   determining a transmission phase angle based on the I signal and the Q signal, wherein the determining of the transmission phase angle generates a determination area using a rotational transformation of Equation 5 as $$\begin{bmatrix} X \\ Y \end{bmatrix} = \begin{bmatrix} \cos(\pi/4) & \sin(\pi/4) \\ -\sin(\pi/4) & \cos(\pi/4) \end{bmatrix} \begin{bmatrix} I \\ Q \end{bmatrix}. \quad \text{[Equation 5]}$$

6. The method of claim 5, further comprising:
   receiving the BPSK signal; and
   performing low noise amplification of the received BPSK signal.

7. The method of claim 5, wherein the generating of the I signal comprises:
   multiplying the first signal generated from the oscillator with the received BPSK signal; and
   integrating the multiplied signal.

8. The method of claim 5, wherein the determining of the transmission phase angle determines the transmission phase angle using the I signal generated from a first integrator and the Q signal generated from a second integrator.

9. A non-transitory computer implemented BPSK demodulating method, the computer implemented method comprising:
   a processor and a memory, the memory having instructions stored thereon to perform the steps of:
   receiving a BPSK signal;
   generating a first signal to separate a baseband signal from the received BPSK signal;
   generating an I signal from the received BPSK signal;
   generating a Q signal from the received BPSK signal, and
   wherein the generating Q signal uses at least one of a plurality of phase shifters and modules having a function of phase shift, and
   wherein the I signal and the Q signal are generated using the first signal from an oscillator,
   wherein the generating of the Q signal comprises:
      generating a second signal by shifting the first signal generated from the oscillator by a first phase angle;
      generating a third signal by shifting the received BPSK signal by a second phase angle;
      multiplying the second signal with the third signal; and
      integrating the multiplied signal, and
   determining a transmission phase angle based on the I signal and the Q signal, and
   wherein the determining of the transmission phase angle generates a determination area using a rotational transformation of Equation 5 as $$\begin{bmatrix} X \\ Y \end{bmatrix} = \begin{bmatrix} \cos(\pi/4) & \sin(\pi/4) \\ -\sin(\pi/4) & \cos(\pi/4) \end{bmatrix} \begin{bmatrix} I \\ Q \end{bmatrix}. \quad \text{[Equation 5]}$$

* * * * *